United States Patent
Peracha et al.

(10) Patent No.: US 8,751,508 B1
(45) Date of Patent: Jun. 10, 2014

(54) CONTEXTUAL INDEXING OF APPLICATIONS

(75) Inventors: Zahur A. Peracha, Irvine, CA (US); Mekka C. Okereke, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 117 days.

(21) Appl. No.: 13/198,185

(22) Filed: Aug. 4, 2011

(51) Int. Cl.
*G06F 17/30* (2006.01)

(52) U.S. Cl.
USPC .......................................... 707/748; 705/26.7

(58) Field of Classification Search
USPC .......................................... 707/748; 705/26.7
See application file for complete search history.

(56) References Cited

U.S. PATENT DOCUMENTS

| | | | |
|---|---|---|---|
| 6,766,351 B1 * | 7/2004 | Datla ........................... | 709/203 |
| 7,707,162 B2 * | 4/2010 | Naphade et al. ........ | 707/999.103 |
| 2011/0055266 A1 * | 3/2011 | Varadarajan et al. .......... | 707/780 |
| 2012/0096435 A1 * | 4/2012 | Manolescu et al. ........... | 717/121 |
| 2012/0143694 A1 * | 6/2012 | Zargahi et al. .............. | 705/14.66 |

OTHER PUBLICATIONS

Wikipedia, Unreachable code, Mar. 9, 2011.*

* cited by examiner

*Primary Examiner* — William Spieler
(74) *Attorney, Agent, or Firm* — Thomas | Horstemeyer, LLP

(57) ABSTRACT

Disclosed are various embodiments for the contextual indexing of applications using an application analyzer. In one embodiment, the application analyzer identifies at least one used element present in an application. The application analyzer computes a weight for the at least one used element, then provides the at least one used element and the respective weight to a contextual index service.

22 Claims, 4 Drawing Sheets

CONTEXTUAL INDEXING OF APPLICATIONS

BACKGROUND

Searching for applications can be a difficult task. Frequently, users do not know the exact name of the application they are looking for and resort to keyword searches to find what they need. However, most application search engines rely completely upon the developer of an application to enter the keywords that best describe the application. The problem with this approach is that developers can associate their application with keywords that may or may not relate to the actual application. As a result, a keyword search of applications may yield applications that are unrelated to the search terms.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to analyzing an application to discover metadata contained within the actual application. Metadata obtained by examining the application may be fed into a contextual index service allowing users to search the metadata in the same manner that they may perform a search of descriptive tags entered by the developer of an application. Furthermore, the descriptive tags entered by the developer may be validated by comparing the descriptive tags against the metadata obtained by analyzing the application. Descriptive tags found to be incongruent and not positively correlated with the metadata obtained by analyzing the application may be treated as likely inaccurate.

In order to obtain metadata by examining the application, the text strings, sounds and images in an application may be searched to extract concise information about these elements of the application. As one can appreciate, any reference to an image or images should be understood to include not only still images, but also images in a temporal sequence associated with a video. As a non-exclusive list, text strings may be found within user interface components, data stores, configuration components, eXtensible Markup Language (XML) or other markup document types. Sound elements may be further analyzed to recognize spoken words, and image elements may be further analyzed to recognize textual characters and identify objects. Each of the elements may be assigned a weight depending upon the frequency of the element is encountered, the prominence of the element or other factors as can be appreciated. Similarly, the application examination process may distinguish the elements that are invoked along a path of execution within the application from those elements that are not along a path of execution. In the following discussion, a general description of the system and its components is provided, followed by a discussion of the operation of the same.

Figure 1:
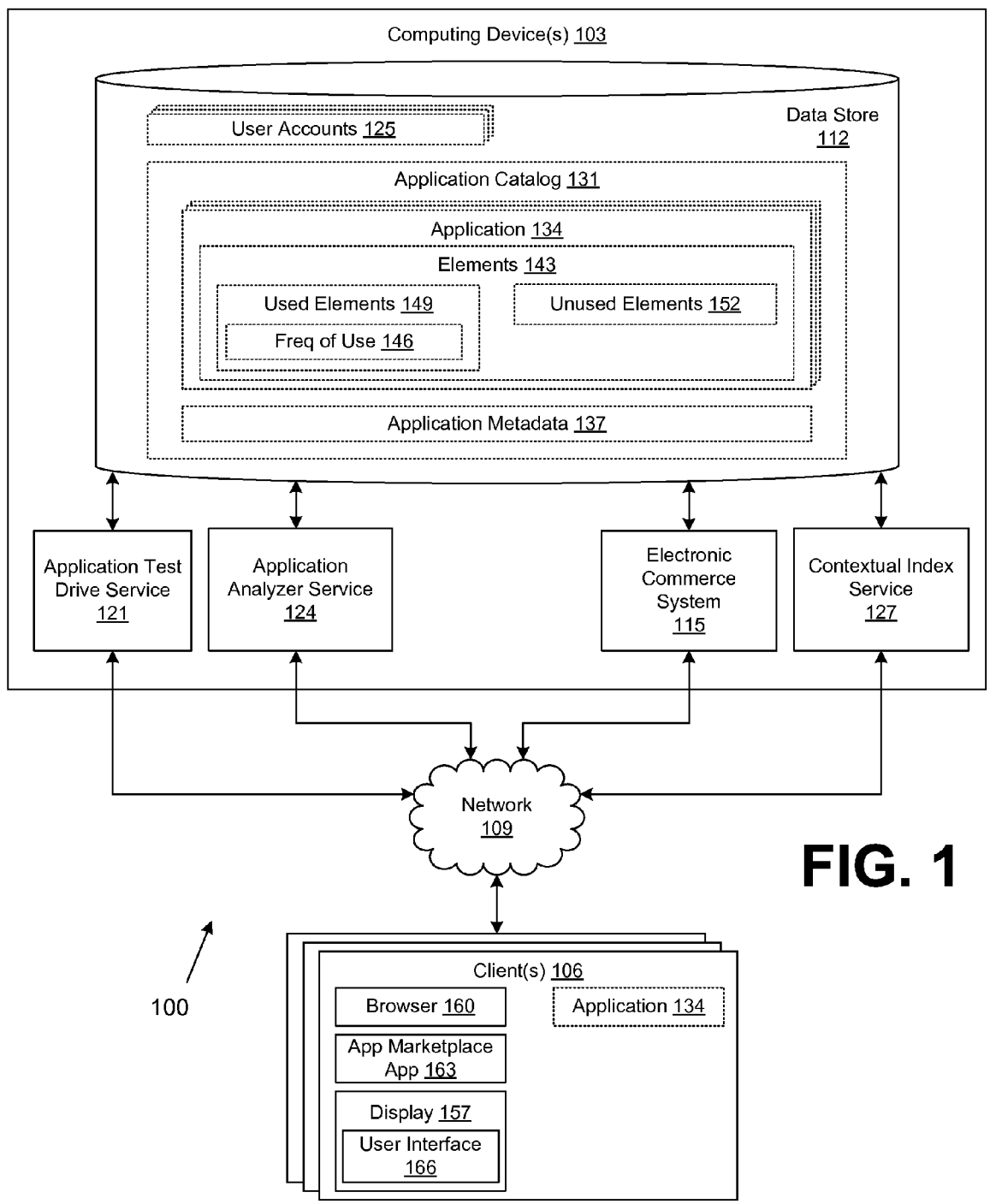
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115, an application test drive service 121, an application analyzer 124, a contextual index service 127 and other applications, services, processes, systems, engines, or functionality not discussed in detail herein.

The electronic commerce system 115 is executed in order to facilitate the online purchase of media items over the network 109. The electronic commerce system 115 also performs various backend functions associated with the online presence of a merchant in order to facilitate the online purchase of media items. For example, the electronic commerce system 115 may generate network pages or portions thereof that are provided to clients 106 for the purposes of selecting media items and/or other items for purchase, rental, download, lease, or other forms of consumption.

The application test drive service 121 is executed to facilitate the monitored use of an application 134. In one embodiment, the application test drive service 121 may generate a user interface or portions thereof that are provided to clients 106 for the purpose of demonstrating use of an application 134 without first requiring a client to download, purchase or install the application 134. The application test drive service 121 allows the client 106 to interact with the application 134 via the user interface 166, while execution of an application 134 takes place entirely from within the computing device(s) 103. Updates to the user interface 166 are generated in the computing device(s) 103, while control instructions are communicated to the application test drive service 121 in the computing device(s) 103 via the network 109.

For example, a client 106 may wish to try the latest version of the game Space Invaders before purchasing and installing it. By using the application test drive service 121, the client 106 may cause the Space Invaders application to be executed in the computing device(s) 103 which may then generate the user interface to the application that is communicated to the client 106 via the network 109. The interactions of the client 106 with the user interface 166 can be communicated back to the computing device(s) 103 via the network 109 providing interactive use of the Space Invaders application.

In another embodiment, the application 134 is executed in the client 106. In this embodiment, interactions of the client 106 with the application 134 via the user interface 166 are recorded and communicated back to the computing device(s) 103. The recording functionality may be embedded within the application 134, within a separate monitoring application or such other embodiments as can be appreciated. For example, a client 106 may wish to use the latest version of an online banking application. In doing so, the interactions of the client 106 with the user interface 166 of the online banking application can be recorded and communicated back to the computing device(s) 103 via the network 109.

The application analyzer service 124 is executed to extract metadata from an application. To this end, such an application analyzer service 124 may perform a binary analysis of the application 134 that examines the machine code of the application 134 to extract elements 143 present in text strings, images or audio. As a non-exclusive list, text strings may be found within user interface components, data stores, configuration components, XML or other markup document types. Furthermore, the application analyzer service 124 may recognize text and objects used in images, as well as recognize spoken words in audio.

In addition to extracting elements 143, the application analyzer service 124 may be capable of distinguishing the elements 143 present in the application 134 that can be invoked along a given path of execution, from those elements 143 present in the application 134 that cannot be so invoked. Furthermore, the application analyzer service 124 may also associate a weight with each element 143 based on, for example, the frequency the element 143 is encountered, the prominence of the element 143 or other factors as can be appreciated. The frequency that an element 143 is encountered is the number of times an element is encountered during execution of the application. The prominence of an element 143 relates to the degree of conspicuousness of the element 143 relative to the other elements 143 invoked. For example, an element 143 representing text from a large headline is more prominent than an element 143 representing small text from a footnote. Such a weight based on frequency, prominence, or other factors would be interpreted as an indicator of the relative significance of each element 143.

The data stored in the data store 112 includes, for example, user accounts 125, an application catalog 131 and potentially other data. The user accounts 125 may include information about user accounts with the electronic commerce system 115. Such information may comprise, for example, name, address, payment instruments, and other information. Account settings may be employed to specify and track various settings and other functionality with respect to a given account such as passwords, security credentials, billing information, and/or other data.

The application catalog 131 relates to applications 134 that are available for purchase or other consumption by a user and may include applications 134, application metadata 137, and/or other data. In one embodiment, the applications 134 may correspond to applications that are available for purchase by the user through the electronic commerce system 115. The applications may be in any form that an application may be delivered to a user, such as in machine code suited for a specific processor architecture, including a virtual machine. Alternatively, applications may be available as source code that is executed by an interpreter application or source code that is compiled into machine code suited for a specific processor architecture, including virtual machines, prior to execution. As another alternative, applications may be available as a document embedded with executable code, such as Hyper Text Markup Language (HTML) with Javascript or Microsoft® Word embedded with Visual Basic. In yet another embodiment, applications may be in a package format that may contain one or more of the application forms previously discussed, such as an Android™ Package (APK) often used by the Android™ operating system or as a Microsoft® Installer package (MSI) often used by the Microsoft® Windows® operating system. The application metadata 137 may include metadata about the various applications 134, such as hardware and operating system requirements, application and library dependencies, purchase or license agreements, disclaimers, commentary by users and/or developers, descriptive tags by users and/or developers and so on.

The application 134 may include elements 143 which include the text strings, images, or audio present in the application 134. The elements 143 in turn are made up of used elements 149 and unused elements 152 and/or other data.

The used elements 149 relate to the elements 143 that are along the reachable paths of execution for application 134. In further explanation, used elements 149 are those elements 143 for which the possibility exists that the elements 143 may be invoked during the execution of the application. In order to determine what elements are along a reachable path of execution, all possible paths of execution may be evaluated.

As an example, consider a media player that may contain an obscure option to delete all the media from a user's media library. When this option is selected, the user interface displays a button with a trashcan icon and a text string label that states: "Delete." The trashcan icon and the text string label would both be used elements 149 because they are each types of elements 143 and each element may be invoked along the reachable paths of execution for application 134.

The unused elements 152 include the elements 143 that are not along a reachable path of execution for application 134. In further explanation, unused elements 152 are those elements 143 for which no possibility exists that the elements 143 may be invoked during the execution of the application.

For example, consider an application 134 that contains a subroutine to display an image of an envelope, followed by a text string that states, "New Message!" If no reachable instruction within the application 134 references the subroutine, it cannot be invoked from within the application 134 and, thus, is not on a reachable path of execution within the application 134. The envelope image and the text string would both be unused elements 152 because they are each types of elements 143, and each element is not on a reachable path of execution within the application 134.

A frequency of use 146 is associated with each of the used elements 149. The frequency of use 146 corresponds to the number of times each of the used elements 149 are actually invoked during execution of an application 134 monitored by the application test drive service 121. In one embodiment, the prominence of a used element 146 may be recorded, as well as recording the client 106 initiating use of the used element 146.

As a non-limiting example, if the application 134 being executed by a plurality of clients 106 in the application test drive service 121 is a media player, the main user interface may contain buttons with images and text string labels that state: "Play," "Stop," "Next Track," "Previous Track," etc. Each of these images and text strings would be a used element 149 whose frequency of use 146 is incremented for each client 106 that invoked the used element 149.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 160, an app marketplace application 163 and/or other applications. The browser 160 may be executed in a client 106, for example, to access and render network pages, such as web pages, or other network content served up by the computing device 103 and/or other servers, thereby rendering a user interface 166 on the display 157. In one embodiment, the browser 160 may provide access to and render a user interface 166 for the application test drive service 121 offered by the computing device 103 and/or other servers.

The app marketplace application 163 may be executed in a client 106 and render a user interface 166, for example, to facilitate access to applications 134 in the application catalog 131 stored on the computing device(s) 103. Access to the applications 134 may include browsing for applications 134, searching for applications 134 via the contextual index service 127, as well as facilitating the purchase of applications 134 via the electronic commerce system 115. In one embodiment, the app marketplace application 163 may provide access to and render a user interface 166 for the application test drive service 121 offered by the computing device 103 and/or other servers. The client 106 may be configured to execute applications beyond the browser 160 and app marketplace application 163, such as, for example, email applications, instant message applications, and/or other applications.

Next, a general description of the operation of the various components of the networked environment 100 is provided. To begin, an application developer submits an application 134 to the application catalog 131. As part of the submission process, the application developer may provide descriptive tags to aid in identifying the purpose and intended use of the application 134. While the application developer would be in the best position to describe the application, for a variety of reasons, the developer may be biased or otherwise inaccurate in his/her assessment of the application. For a developer seeking to maximize the number of users and/or purchasers of the application 134, he/she may be incentivized to overstate the potential uses of the application 134 by including as many descriptive tags as possible. Ordinarily, such a strategy would cause the application 134 to be listed in application search results far more often than the application 134 is actually relevant. However, according to one embodiment, the application analyzer service 124 obtains an independent set of descriptors from the application 134 itself, therefore search results are based upon an additional point descriptive analysis, which is more objective.

The application analyzer service 124 examines each application 134 to identify text strings, images, audio and other objects present in the application that may aid in identifying the purpose and intended use of the application. This includes recognizing elements 143 from, for example, displayed text, text and objects in an image or sequence of images from a video, spoken words in audio segments, text in metadata and text in data stores.

The application analyzer service 124 then performs a static analysis of the application 134 to separate the elements 143 into the used elements 149 that may be invoked in during execution from the unused elements 152 that cannot be invoked during execution. The application analyzer service 124 may perform the static analysis by tracing the application 134 through all reachable paths of execution while recording the used elements 149 invoked along each path. In one embodiment, the application analyzer service 124 may further record the frequency of use 146 and prominence of each used element 149 while traversing all the reachable paths of execution. Both the unused elements 152 and the used elements 149, along with any frequency of use 146 and prominence data for the used elements 149, may be provided by the application analyzer service 124 to the contextual index service 127 for processing.

In one embodiment, the descriptive tags entered by the application developer are correlated with the used elements 149, along with any frequency of use 146 and prominence data for the used elements 149, producing a degree of correlation. A positive degree of correlation suggests the compared terms are positively correlated, whereas a zero or negative degree of correlation suggests the compared terms are not related or are inversely related. In one embodiment, if the descriptive tags given by the application developer are not positively correlated with the used elements 149, the weight given to the descriptive tags may be diminished and/or the descriptive tags ignored. In another embodiment, if some or all of the descriptive tags given by the application developer are positively correlated with the unused elements 152, the weight given to such descriptive tags may be diminished and/or such descriptive tags may be ignored.

Client 106 interaction may begin when a client 106 seeks to find an application 134 from the application catalog 131. The application catalog 131 may contain many hundreds, thousands, or more of applications 134, so the client 106 could benefit from narrowing the list of potential candidate applications 134 that meet their requirements. In order to find such an application, the client 106 would access the contextual index service 127 and provide keywords that describe the kind of application they are seeking. Based upon any descriptive tags entered by the application developer, in combination with the information provided by the application analyzer 124 to the contextual index service 127 about each application 134 in the application catalog 131, the contextual index service 127 should return the list of applications 134 related to the keywords entered. For each application 134 in the resulting list, the client 106 could review the application metadata 137 to find more information about the application 134 and further confirm the relevance of the application 134 to their needs.

Upon finding an application 134 through the contextual index service 127 that meets the requirements, the client 106 could acquire the application 134 through the electronic commerce system 115. Alternatively, in one embodiment, the client 106 may try the application 134 before acquiring it using the application test drive service 121. This permits a user to further validate that the application 134 performs as expected prior to taking the time and expense of acquiring it.

In another embodiment, data from the use of an application 134 by a client 106 through application test drive service 121 may be collected by the application analyzer service 124 to further improve relevancy of search results. The application analyzer service 124 may record the frequency of use 146 for each used element 149 invoked during each use of each application 134 monitored by the application test drive service 121. Additionally, the application analyzer service 124 may further record the prominence of each used element 149 during each use of each application 134 monitored by the application test drive service 121. The used elements 149, along with any frequency of use 146 and prominence data for the used elements 149, may be provided by the application analyzer service 124 to the contextual index service 127 for processing. The frequency of use 146 for each used element 149 evolves through further use of the application 134 monitored by the application test drive service 121, therefore the frequency of use 146 data provided to the contextual index service 127 will also continue to evolve.

Figure 2:
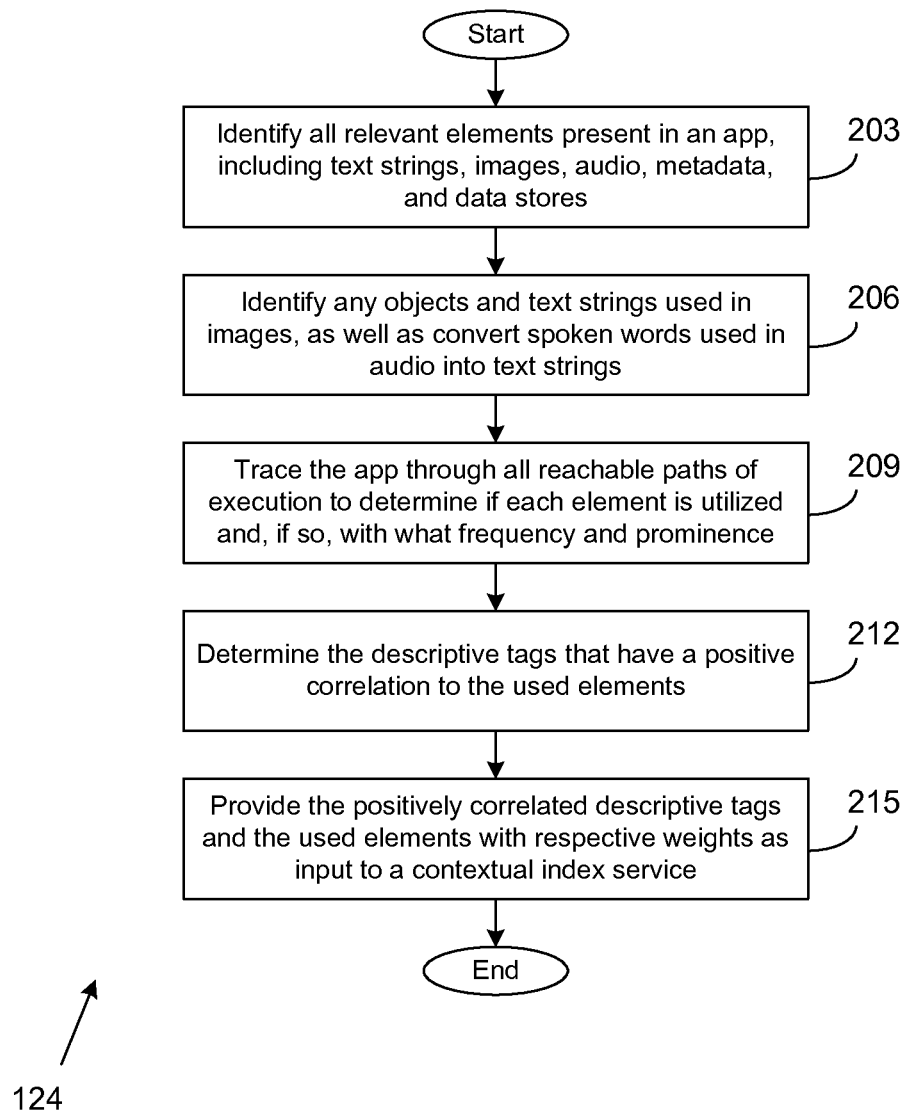
FIG. 2 is a flowchart illustrating one example of functionality implemented as portions of the application analyzer service executed in a computing device in the networked environment of FIG. 1 according to various embodiments of the present disclosure.

Referring next to FIG. 2, shown is a flowchart that provides one example of the operation of a portion of the application analyzer 124 according to various embodiments. It is understood that the flowchart of FIG. 2 provides merely an example of the many different types of functional arrangements that may be employed to implement the operation of the portion of the application analyzer 124 as described herein. As an alternative, the flowchart of FIG. 2 may be viewed as depicting an example of steps of a method implemented in the computing device 103 (FIG. 1) according to one or more embodiments. The functionality or steps represented in FIG. 2 is implemented in response to a request made to the application analyzer service 124 for a static analysis of an application 134 (FIG. 1).

Beginning with box 203, the application analyzer service 124 may examine the application for elements 143 (FIG. 1) present in text strings, images or audio. As a non-exclusive list, text strings may be found within user interface components, data stores, configuration components, XML or other markup document types. Furthermore, the application analyzer service 124 may recognize text and objects used in images, as well as recognize spoken words in audio.

The application analyzer service 124 is capable of searching applications 134 in any form that an application may be delivered to a user, such as in machine code suited for a specific processor architecture, including a virtual machine. Alternatively, applications may be available as source code that is executed by an interpreter application or source code that is compiled into machine code suited for a specific processor architecture, including virtual machines, prior to execution. As another alternative, applications may be available as a document embedded with executable code, such as HTML with Javascript or Microsoft® Word embedded with Visual Basic. In yet another embodiment, applications may be in a package format that may contain one or more of the application forms previously discussed, such as an APK often used by the Android™ operating system, or as a MSI often used by the Microsoft® Windows® operating system or some other forms.

Once elements 143 have been identified in box 203, in box 206 the application analyzer service 124 employs a recognition process used for image and audio elements 143. According to one embodiment of the application analyzer service 124, images, such as still images or a sequence of "moving" images, are analyzed using a Discrete Cosine Transform (DCT) or similar process to recognize objects, including recognizing text strings as is done in an Optical Character Recognition (OCR) process. Likewise, the application analyzer service 124 scans audio elements 143 using a voice recognition process in order to identify spoken words present in an audio segment.

Next, in box 209, the application analyzer 124 statically traces execution of the application 134 through all reachable paths of execution to determine the elements 143 that are invoked, and thus are noted or recorded as used elements 149 (FIG. 1). The elements 143 that are not eventually invoked during the trace through all reachable paths of execution are noted or recorded as unused elements 152 (FIG. 1). In one embodiment, each used element 149 is further given a weight as an indicator of significance based on the frequency and prominence of the used element 149.

As described previously, one problem with existing application search solutions is that they depend upon developers describing the application 134 using descriptive tags. Developers may exaggerate the capabilities of the application 134 in order to increase the likelihood that the application 134 appears on a list of search results, thereby increasing the likelihood someone will acquire it.

The same potential still exists if the application analyzer service 124 examines an application 134 without regard to whether each element 143 is actually used. For instance, it might still be possible for the developer to enter the misleading keywords in an unused subroutine such that operation of the application 134 is unchanged, but the application analyzer service 124 would be affected. Tracing all reachable paths of execution avoids this potential problem by ensuring that only the elements 143 that may be used are to be included in the used elements 149. In one embodiment, the presence of unused elements 152 could cause the descriptive tags by the developer to be ignored or given less weight. In another embodiment, the presence of unused elements 152 could cause the application to appear lower in search result, or any other appropriate action given the apparent intent to deceive by the developer.

In box 212, the application analyzer service 124 determines the descriptive tags that are positively correlated to any of the used elements 149. The descriptive tags having no statistical relationship or that are inversely related to all of the used elements 149 are disregarded by the application analyzer service 124.

In box 215, the application analyzer service 124 provides the positively correlated descriptive tags and the used elements 149, along with the frequency of use 146 and any prominence data for the used elements 149, to the contextual index service 127 (FIG. 1) for processing. Thereafter, this portion of the application analyzer service 124 ends as shown.

Figure 3:
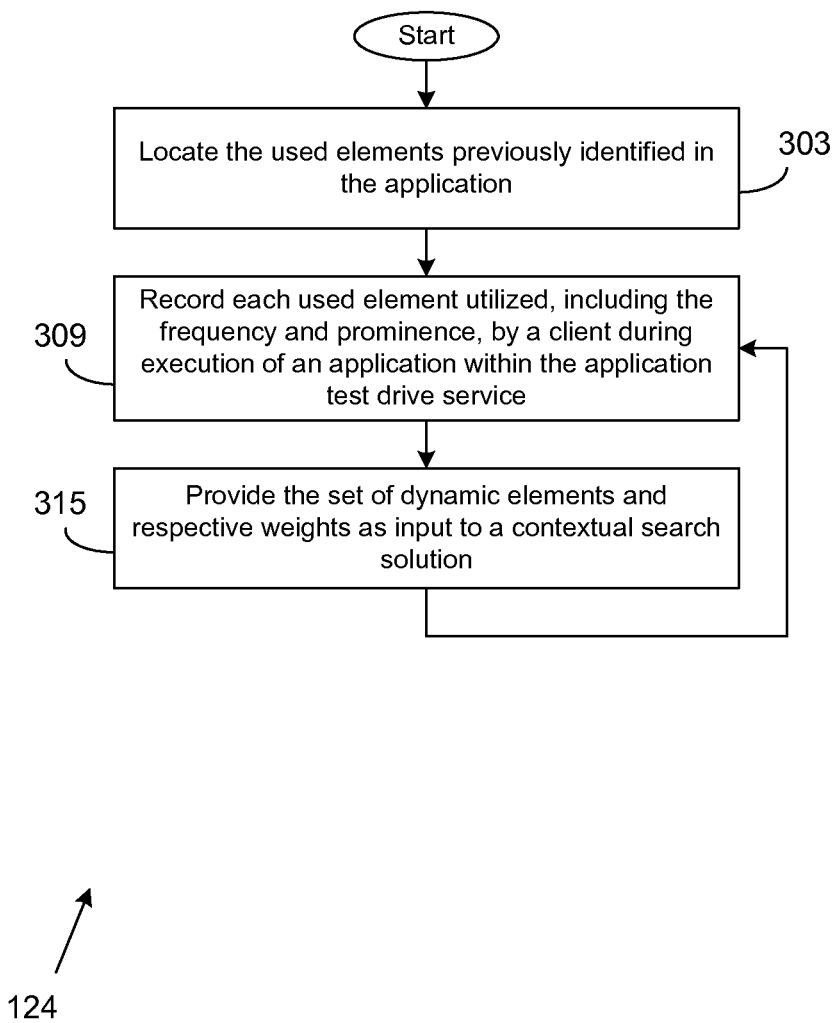
FIG. 3 is a flowchart illustrating another example of functionality implemented as portions of the application analyzer service executed in a computing device in the networked environment of FIG. 1 according to various embodiments of the present disclosure.

Referring next to FIG. 3, shown is a flowchart that provides one example of the operation of a portion of the application analyzer 124 according to various embodiments. It is understood that the flowchart of FIG. 3 provides merely an example of the many different types of functional arrangements that may be employed to implement the operation of the portion of the application analyzer 124 as described herein. As an alternative, the flowchart of FIG. 3 may be viewed as depicting an example of steps of a method implemented in the computing device 103 (FIG. 1) according to one or more embodiments. The functionality or steps represented in FIG. 3 is implemented in response to a request made to the application analyzer service 124 for a dynamic analysis of an application 134 (FIG. 1).

In box 303, the application analyzer service 124 locates the used elements 149 (FIG. 1) in the application 134 identified previously in the static analysis. In box 309, the application analyzer service 124 records the frequency of use 146 (FIG. 1) of each of the used elements 149 invoked during execution of the application 134 monitored by the application test drive service 121 (FIG. 1). In one embodiment, the prominence with which a used element 146 is used by a client 106 may also be recorded, as well as recording the client 106 initiating use of the used element 146. The knowledge from the actual use of the application 134 may permit the application analyzer service 124 to adjust the weight given to particular used element 149.

In box 315, the application analyzer service 124 provides both the used elements 146, along with the frequency of use 146 and any prominence data for the used elements 149, to the contextual index service 127 (FIG. 1) for processing. The frequency of use 146 for each used element 149 evolves through further use of the application 134 monitored by the application test drive service 121, therefore the frequency of use 146 data provided to the contextual index service 127 will also continue to evolve. The cycle of operation by the application analyzer service 124 shown in boxes 309 and 315 continues based on continued use of an application 134 monitored by the application test drive service 121, or until interrupted.

Figure 4:
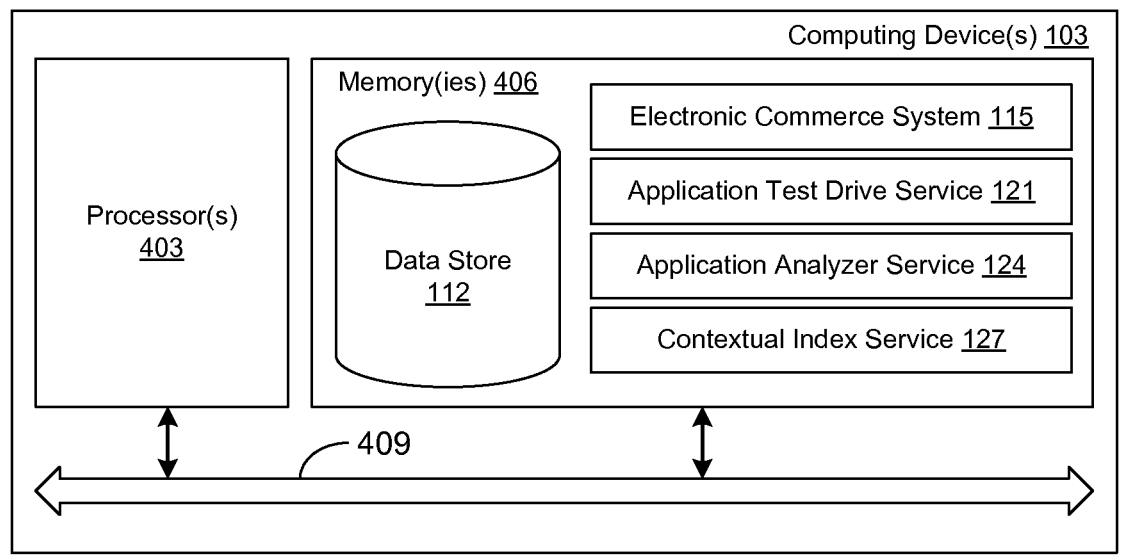
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 115, application test drive service 121, application analyzer service 124, contextual index service 127 and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 115, application test drive service 121, application analyzer service 124, contextual index service 127 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the contextual indexing of applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, application test drive service 121, application analyzer service 124, contextual index service 127 and potentially other applications, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that identifies a plurality of used elements invoked in a user interface of an application during execution of the application, including at least one of:
        text present in an image of the application;
        at least one object present in the image; and
        a spoken word present in an audio segment of the application;
    code that calculates a number of times the used elements are invoked during the execution of the application;
    code that calculates a weight for each of the used elements;
    code that determines a degree of correlation between a plurality of previously existing descriptive tags associated with the application and the used elements; and
    code that provides a plurality of positively correlated ones of the descriptive tags and the used elements to a contextual index service, wherein the positively correlated ones of the descriptive tags and the used elements are employed to determine if the application is relevant to a search.

2. The non-transitory computer-readable medium of claim 1, wherein each of the weights is calculated based at least upon a prominence of a respective one of the used elements.

3. The non-transitory computer-readable medium of claim 1, wherein the program further comprises code that provides the used elements and the respective weights to the contextual index service, wherein at least the used elements and the respective weights are employed to determine if the application is relevant to the search.

4. The non-transitory computer-readable medium of claim 1, wherein code that identifies the used elements is further configured to trace all of a plurality of reachable paths of execution within the application.

5. A system, comprising:
    at least one computing device; and
    an application analyzer executable in the at least one computing device, the application analyzer comprising:
        logic that identifies a plurality of used elements present in a user interface generated during an execution of an application;
        logic that computes a weight for each of the used elements; and
        logic that provides the used elements and the respective weights to a contextual index service, wherein the used elements and the respective weights are indexed to make the application responsive to a search.

6. The system of claim 5, wherein the application analyzer further comprises logic that traces all of a plurality of reachable paths of execution within the application.

7. The system of claim 5, wherein the execution of the application is directed by a plurality of instructions received from a client device over a network.

8. The system of claim 5, wherein the application analyzer further comprises:
    logic that generates a degree of correlation between the used elements and a plurality of previously existing descriptive tags associated with the application; and
    logic that provides a plurality of positively correlated ones of the descriptive tags to the contextual index service, wherein the positively correlated ones of the descriptive tags are indexed in order to make the application responsive to the search.

9. The system of claim 8, wherein the application analyzer further comprises:

logic that identifies at least one unused element present in the application, wherein the at least one unused element is not along a reachable path of execution within the application;

logic that instructs the contextual index service to remove the positively correlated ones of the descriptive tags from the contextual index service.

10. The system of claim 8, wherein the application analyzer further comprises:

logic that identifies at least one unused element present in the application, wherein the at least one unused element is not along a reachable path of execution within the application;

logic that generates a degree of correlation between the at least one unused element and the descriptive tags associated with the application; and logic that prevents submission of a portion of the descriptive tags to the contextual index service, the portion being positively correlated with the at least one unused element.

11. The system of claim 5, wherein the logic that identifies the used elements further comprises logic that identifies a plurality of text strings present in at least one image associated with the application.

12. The system of claim 11, wherein the at least one image is included in a sequence of a plurality of images comprising a video.

13. The system of claim 5, wherein the logic that identifies the used elements further comprises logic that recognizes at least one object present in at least one image associated with the application.

14. The system of claim 13, wherein the at least one image is included in a sequence of a plurality of images comprising a video.

15. The system of claim 5, wherein the logic that identifies the used elements further comprises logic that recognizes a plurality of spoken words present in an audio segment associated with the application.

16. The system of claim 5, wherein the logic that calculates the weight for each of the used elements further calculates the weight based at least upon a frequency of use for respective ones of the used elements.

17. The system of claim 5, wherein the logic that calculates the weight for each of the used elements further calculates the weight based at least upon a prominence of respective ones of the used elements.

18. A method, comprising the steps of:

performing, in a computing device, a binary analysis of a plurality of portions of an application to identify a plurality of used elements, the used elements being present within a user interface generated during execution of the application;

generating, in the computing device, a degree of correlation between the used elements and ones of a plurality of previously existing descriptive tags; and providing, in the computing device, a plurality of positively correlated ones of the descriptive tags and the used elements to a contextual index service, wherein at least the positively correlated ones of the descriptive tags and the used elements are employed to determine if the application is relevant to a search.

19. The method of claim 18, wherein the portions of the application comprise all of a plurality of reachable paths of execution within the application.

20. The method of claim 18, wherein at least some of the portions of the application are invoked via a plurality of instructions received from a client device over a network.

21. The method of claim 18, further comprising the steps of:

wherein the binary analysis of the plurality of portions of the application is further performed to identify at least one unused element; and providing, in the computing device, instruction to the contextual index service to disqualify the positively correlated ones of the descriptive tags from the contextual index service.

22. The method of claim 18, wherein providing the positively correlated ones of the descriptive tags occurs only if all of the descriptive tags were positively correlated.

* * * * *